(12) United States Patent
Liu

(10) Patent No.: US 8,871,498 B2
(45) Date of Patent: Oct. 28, 2014

(54) DEVICE FOR MEASURING AN ULTRA LOW GAS FLOW

(75) Inventor: Jing Liu, Lund (SE)

(73) Assignee: Bioprocess Control Sweden AB, Lund (SE)

( * ) Notice: Subject to any disclaimer, the term of this patent is extended or adjusted under 35 U.S.C. 154(b) by 0 days.

(21) Appl. No.: 13/264,193

(22) PCT Filed: Apr. 1, 2010

(86) PCT No.: PCT/SE2010/050371
§ 371 (c)(1),
(2), (4) Date: Nov. 14, 2011

(87) PCT Pub. No.: WO2010/120229
PCT Pub. Date: Oct. 21, 2010

(65) Prior Publication Data
US 2012/0064616 A1    Mar. 15, 2012

Related U.S. Application Data

(60) Provisional application No. 61/202,860, filed on Apr. 14, 2009.

(30) Foreign Application Priority Data

Apr. 14, 2009  (SE) ...................................... 0950240

(51) Int. Cl.
*C12M 1/107* (2006.01)
*G01F 3/26* (2006.01)
*G01F 3/30* (2006.01)

(52) U.S. Cl.
CPC .. *G01F 3/26* (2013.01); *G01F 3/30* (2013.01); *Y02E 50/343* (2013.01)
USPC .......................................... 435/287.5; 73/861

(58) Field of Classification Search
USPC .................................. 73/665, 861; 435/287.5
See application file for complete search history.

(56) References Cited

U.S. PATENT DOCUMENTS 4,064,750 A * 12/1977 Speece ....................... 73/861.21

(Continued)

FOREIGN PATENT DOCUMENTS

CN          1672032 A      9/2005   ............ G01N 21/00

(Continued)

OTHER PUBLICATIONS

Ferreira, L.M., Duarte, E. A., Figueiredo, D.—2008. Pilot scale experience of anaerobic co-digestion of pig slurry with fruit wastes—on site operation in a pig farm with a mobile plant. 13th International conference of the FAO ESCORENA network on the RAMIRAN, Albena, Bulgaria, Jun. 11-14, 2008. p. 100-104.*

(Continued)

*Primary Examiner* — Sean E Conley
*Assistant Examiner* — Donald Spamer
(74) *Attorney, Agent, or Firm* — Ladas & Parry LLP

(57) ABSTRACT

A measuring device is disclosed for measuring an ultra low gas flow, working by the principle of liquid displacement. In at least one embodiment, the measuring device includes at least one cell including a gas inflow device, a gas compartment device with a predefined inner geometric physical volume and active volume. In at least one embodiment, the gas compartment device includes one gas accumulating end and one lifting end, the gas compartment device also defining a geometric gas collecting point inside of the gas compartment device, during a gas filling cycle, the geometric gas collecting point moving further and further from the gas accumulating end to the lifting end during the gas filling cycle. Further, in at least one embodiment the cell includes a holding device having a pivoting element enabling the gas compartment device to pivot upwards when the geometric gas collecting point is positioned at the lifting end and the lifting force is larger than the down-pressing force at the lifting end, thereby releasing all of the accumulated gas in the gas compartment device, and then pivoting back to its initial standby position for new receipt and storage of gas during another gas filling cycle until next releasing sequence. Finally, in at least one embodiment, the cell also includes a sensor provided to generate a signal and/or change the state of a signal when the gas compartment device is not in its initial standby position, wherein the gas storing capacity of the inside of the gas compartment device is larger at the gas accumulating end than at the lifting end and wherein the gas accumulating end has a higher vertical position than the lifting end at the initial standby position.

19 Claims, 2 Drawing Sheets

(56) References Cited

U.S. PATENT DOCUMENTS

| | | | |
|---|---|---|---|
| 4,259,302 A | 3/1981 | Katz et al. | 423/237 |
| 4,409,102 A | 10/1983 | Tanner | 210/603 |
| 5,092,181 A | 3/1992 | Kuss et al. | |
| 5,325,725 A * | 7/1994 | Sanderson et al. | 73/861.21 |
| 5,500,306 A | 3/1996 | Hsu et al. | |
| 6,299,774 B1 | 10/2001 | Ainsworth et al. | 210/603 |
| 7,655,202 B2 | 2/2010 | Joshi et al. | 423/210 |
| 2004/0086608 A1 | 5/2004 | Pazik et al. | |
| 2012/0064565 A1 | 3/2012 | Liu | 435/29 |

FOREIGN PATENT DOCUMENTS

| | | |
|---|---|---|
| DE | 4006508 A1 | 9/1991 |
| EP | 2009080 | 12/2008 |
| JP | 59069195 | 4/1984 |
| JP | 2006-205135 A | 8/2006 |
| JP | 2008255209 | 10/2008 |
| WO | WO 2004/003506 | 1/2004 |

OTHER PUBLICATIONS

PCT International Preliminary Report on Patentability dated Oct. 18, 2011 for PCT/SE2010/050371.

Office Action Dated Sep. 17, 2012 issued in U.S. Appl. No. 13/264,202.

International Preliminary Report on Patentability dated Oct. 18, 2011 issued in PCT Application No. PCT/SE2010/050372.

International Search Report dated Jun. 2, 2010 issued in PCT Application No. PCT/SE2010/050372.

Chinese Search Report dated Oct. 17, 2012 for CN Application No. 201080016361.5.

Strik, D., et al. (2006), "A pH-based control of ammonia in biogas during anaerobic digestion of artificial pig manure and maize silage", *Process Biochemistry*, 41: 1235-1238.

Office Action dated Nov. 30, 2012 issued in U.S. Appl. No. 13/264,202.

Office Action dated Apr. 9, 2013 issued in U.S. Appl. No. 13/264,202.

Office Action dated Nov. 4, 2013 issued in U.S. Appl. No. 13/264,202.

Chinese Search Report dated Jan. 23, 2014 issued in Chinese Application No. 201080016361.5.

Owen, W.F., et al. (1978) "Bioassay for monitoring biochemical methane potential and anaerobic toxicity", *Water Research* 13:485-492.

Valcke, D., et al. (1983) "A practical method to estimate the acetoclastic methanogenic biomass in anaerobic sludges", *Journal (Water Pollution Control Federation)*, 55(9):1191-1195.

International Search Report, May 27, 2010.

General Chemistry Online, "What happens when sodium bicarbonate is heated?" Retrieved from Internet Archive Wayback Machine capture from Jun. 4, 2008. www.web.archive.org/web/20080104033840/http://antoine.frostburg.edu/chem/senese/101/inorganic/faq/carbonate-decomposition.shtml.

O'Leary, D., "Carbon Dioxide", Retrieved from Internet Archive Wayback Machine capture Mar. 29, 2007. www.web.archive.org/web/20070329201708/http://www.ucc.ie/academic/chem/dolchem/html/comp/co2.html.

Office Action dated Feb. 26, 2014 issued in U.S. Appl. No. 13/264,202.

Extended European Search Report mailed Jul. 29, 2014; Appln. No. 10764736.4-1554/2419385 PCT/SE2010050372.

* cited by examiner

Fig. 1 A-D

DEVICE FOR MEASURING AN ULTRA LOW GAS FLOW

This is application is National Phase entry of PCT Application number PCT/SE2010/050371 filed on Apr. 1, 2010, which claims priority under 35 U.S.C. §119 and 365 to U.S. Provisional Application No. 61/202,860 filed on Apr. 14, 2009, and which also claims priority under 35 U.S.C. §119 and 365 to Sweden Patent Application No. 0950240-2 filed on Apr. 14, 2009, the contents of each of which are hereby incorporated herein by reference in their entirety.

TECHNICAL FIELD

The present invention relates to a device for measuring an ultra low gas flow, working by the principle of liquid displacement, especially a measuring device for measuring a biogas and biomethane gas flow from a bio-sample.

TECHNICAL BACKGROUND

Today there exist measuring devices working by the principle of liquid displacement, such as for use when measuring e.g. biogas flows, e.g. in the anaerobic biodegradation process. In the anaerobic biodegradation process, gas flow rate and methane content are key parameters for evaluating the process performance. In laboratory scale experiments, the bioreactor volume is usually quite small, often only a few liters. The biogas production is also low, especially during the startup period, often a few milliliters per hour. Measuring such a low flow rate of biogas precisely is therefore not an easy task. The commercially available gas flow meters are usually not suitable for measuring such a small amount of gas with low flow rates. To solve this practical problem, several gas-measuring systems have been devised. Most of these systems are based on the principle of liquid displacement. The volume of a gas sample immersed in a fluid is determined by measuring the volume of the displaced fluid. Although there are gas flow meters being reported and/or commercialized based on the liquid displacement technique and pressure analysis technique, the design and construction of these flow meters are still too complicated. As a result, cost for these meters is too high which makes it difficult to implement widely.

One example of such a known device is the measuring device described in U.S. Pat. No. 4,064,750, which discloses an inverted bucket having a pair of gas entrapping compartments alternatively positioned over the gas discharging end of an inlet conduit submerged within a body of liquid. The bucket is pivotally displaced between its operative positions by the buoyant force exerted by a preset quantity of gas accumulated. The gas is accumulated in one compartment while the gas previously accumulated in the other compartment escapes. Displacement of the bucket is detected and registered by a counter mechanism.

One of the drawbacks with the device disclosed in U.S. Pat. No. 4,064,750 is that the device disclosed therein comprises quite complicated and costly components. Moreover, the counter system used for measuring the gas flow is a very old and complicated system, usually a mechanical counter system. The device disclosed in U.S. Pat. No. 4,064,750 is very similar to a device disclosed in patent DE 4006508, at least in terms of functionality and working principle. Also this device is complicated and comprises costly components.

Yet a further measuring device is disclosed in U.S. Pat. No. 5,325,725, which discloses a measuring cup, mounted upside down on a pivot. The device has means for guiding gas to a position under the cup, so that gas accumulates in the cup. When sufficient gas is gathered under the cup, the combined buoyancy of the cup and gas will cause the cup to rotate whereby a predetermined amount of gas, all or only a portion of the gas, will be released from the cup to an outlet.

A drawback with the device disclosed in U.S. Pat. No. 5,325,725 is that the device does not provide enough accuracy. Firstly, the design of the measuring cup is such that it does not respond to a sufficiently small amount of excess gas. Secondly, simultaneous release of all gas is not specifically promoted since the design is such that partial release of gas is just as satisfactory, as regards the use of the device.

Another type of measuring device is disclosed in U.S. Pat. No. 5,092,181. U.S. Pat. No. 5,092,181 discloses a method and apparatus for measuring minute gas flows and/or accumulations wherein a gas flow is bubbled through a defined path in separated form and a sensor is used to detect and count each bubble. The bubble count signal can be used to calculate gas accumulation, or to calculate gas flow rate if made during a defined time period, or to meter the flow of the gas to a point of utilization.

There are some drawbacks with the device according to U.S. Pat. No. 5,092,181. As understood from above, the device is an apparatus of optical bubble counter system. One probable problem with such systems is their inaccuracy. When just counting bubbles and then measuring the gas flow, the assumption is made that the volumes of the different bubbles are the same, which is not correct. This assumption works alright when the gas flow is low and constant. However, the size of the bubbles may vary with the flow velocity, and hence, this assumption should render an inaccurate flow measurement for most flows as these varies. According to U.S. Pat. No. 5,092,181, the volumes of the different bubbles are said to be substantially equal, but this may thus in fact be an error source.

One of the objects of the present invention is to provide a gas measuring device working by the principles of liquid displacement, which is effective, gives an accurate flow measurement, and is inexpensive to produce, both in terms of material and production costs. Other objects of the present invention will be apparent from the summary of the invention and the detailed description below.

SUMMARY OF THE INVENTION

The object above is solved by a measuring device for measuring an ultra low gas flow, working by the principle of liquid displacement, wherein the measuring device comprises at least one cell comprising a gas inflow means, a gas compartment means with a predefined inner geometric physical volume and active volume, the gas compartment means having one gas accumulating end and one lifting end, the gas compartment means also defining a geometric gas collecting point inside of the gas compartment means during a gas filling cycle, the geometric gas collecting point moving further and further from the gas accumulating end to the lifting end during the gas filling cycle, and wherein the cell comprises a holding means having a pivoting element enabling the gas compartment means to pivot upwards when the geometric gas collecting point is positioned at the lifting end and the lifting force is larger than the down-pressing force at the lifting end, thereby releasing all of the accumulated gas in the gas compartment means, and then pivoting back to its initial standby position for new receipt and storage of gas during another gas filling cycle until next releasing sequence, and wherein the cell also comprises a sensor means provided to generate a signal and/or change the state of a signal when the gas compartment means is not in its initial standby position, wherein the gas storing capacity of the inside of the gas compartment means is larger at the gas accumulating end than at the lifting end and wherein the gas accumulating end has a higher vertical position than the lifting end at the initial standby position. The working principle of the cell according to the present invention is the following. The cell is placed in a liquid bath, such a liquid bath e.g. containing water, with the gas filling space of the compartment means of the cell facing against the bottom of the liquid bath. Potentially the liquid can be any liquid with low viscosity and chemically inert to the target gas to be monitored. The gas being measured is flowed into the compartment means via the gas inflow means. The compartment means is continuously filled with gas until the lifting force of the gas is large enough for ensuring the compartment means to pivot upwards. The design of the compartment means according to the present invention may be totally different, but one mutual property of the designs is the gas accumulating end and the lifting end. When the compartment means is filled, the gas accumulating end has a gas storing capacity which is larger than the lifting end of the compartment means. The high gas measuring accuracy of the present invention is ensured by a principle that is very similar to the lever effect. The gas collected at the end of a filling phase has larger pivoting force to lift the compartment means. This is due to that the geometric gas collection point is moving from the accumulating end towards the lifting end during each gas filling cycle. Since the gas collection point is getting far from the pivoting element during each filling cycle, the effect of the lifting force is much higher at the end of a filling stage. This property is important to ensure a high gas measuring accuracy of the present invention, which is obtained by the fact that only a very small additional gas volume is needed when the compartment means is nearly full to create the pivoting force for the compartment means.

On its initial standby position, the sensor means either does not generate a signal or delivers a signal that indicates its standby position. When the compartment means is full and the lifting force at the lifting end is creating the pivoting effect upwards, the sensor means generates a signal and/or changes the signal being generated at the initial standby position until the compartment means has returned to its initial standby position. These signals may e.g. be configured as false and true at the initial standby position and during the pivoting cycle, respectively. Due to the design of the cell according to the present invention, with a gas accumulating end and a lifting end, the pivoting of the compartment means, when full, is considerable and quick, all of the accumulated gas held by the compartment means is quickly released from the compartment means and the compartment means then returns to its initial standby position. It is important to understand that the design of the present measuring device ensures that all of the accumulated gas is released quickly and completely when the compartment means is pivoting upwards. In other words, when the compartment means returns to its initial standby position after the gas has been released, then the compartment means is empty of gas.

The compartment means of the cell is said to have an inner geometric physical volume as well as an active volume. The geometric physical volume is the actual volume of the inner space of the compartment means. For one cell according to the present invention this volume is predefined and cannot be adjusted other than by producing a new cell having another geometric physical volume of its compartment means. The active volume of the compartment means is the actual volume needed for pivoting the cell from its initial standby position. According to one specific embodiment of the present invention, this volume may be adjusted for a cell according to the present invention, which can be accomplished by changing the force needed for the compartment means to pivot. This may e.g. be accomplished by amending the buoyant property of the compartment means or e.g. by different positioning of the holding means with its pivoting element along the compartment means. The different possibilities to change the active volume of the compartment means will be discussed below in more detail. Moreover, it is important to understand that the flow cell according to the present invention may have fixed physical volume as well as fixed active volume.

The measuring device according to the present invention has many advantages in comparison to known devices, such as the ones disclosed in U.S. Pat. Nos. 4,064,750, 5,325,725 and 5,092,181. The key properties of the measuring device according to the present invention may be summarised according to the following:

- works according to a new principle ensuring high measuring accuracy;
- is simple in its design and construction;
- has a low material and construction cost;
- has a standardized and modularized cell design, however still has the possibility for varying the compartment volume;
- has calibration capabilities;
- is potentially capable to measure ultra small gas flow, as low as few milliliters per day; and
- is feasible for multi-flow cell arrangement, such as flow cell array for a large number of gas flow monitoring.

DETAILED DESCRIPTION OF THE INVENTION

Figure 1:
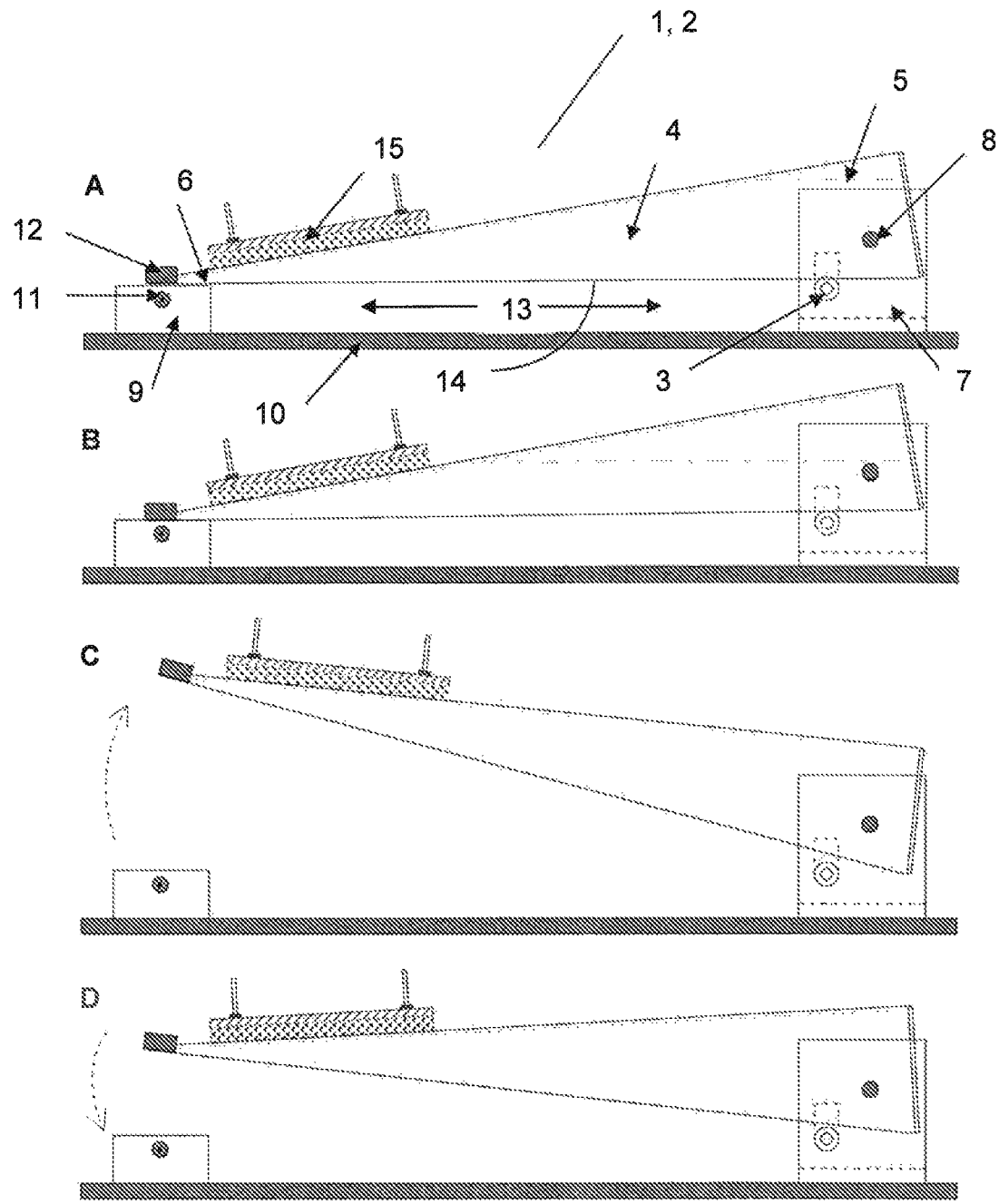
FIG. 1A-D is an illustration of one example of a measuring device according to the present invention and the working principle of the same.

Specific embodiments of the measuring device according to the present invention will be disclosed below.

According to one specific embodiment, the holding means is located close to the gas accumulating end. The holding means of the cell could in fact be provided at different places along the compartment means, but it may be of interest to provide it close to the end having the largest gas storing capability. This may be of interest to make sure that the additional lifting force needed at the lifting end to lift the compartment means should be very small, such as only one additional small gas bubble. This means that when the geometric gas collecting point already has moved from the gas accumulating end towards the lifting end during a gas filling cycle, the additional lifting effect needed at the gas collecting point, now situated at the actual lifting end, is only one small gas bubble. It is however important to realise that the holding means could be provided at many different places and the only limiting factor is that the holding means should be placed so that the gas accumulating end at least has a larger gas storing capability than the lifting end of the compartment means.

The sensor means of the measuring device may be of different type and provided at different places. However, according to one specific embodiment of the present invention, the sensor means is provided to be in physical contact with the lifting end of the gas compartment means when the gas compartment means has its initial standby position. This is of course one of the more effective versions of the placing of the sensor means according to the present invention.

The gas inflow means may also be located at different places. The important property of the compartment means of the cell according to the present invention is the provision of a gas accumulating end and a lifting end. Therefore, it is not of any greater importance where the gas inflow means is provided. The gas storing capacity will still be larger at the gas accumulating end than at the lifting end according to the present invention, and the compartment means will hence not be lifted upwards until the lifting force is larger than the down-pressing force at the lifting end, wherever the gas inflow means is provided. The accumulating end is that end of the gas compartment means that will be filled with gas first during a filling sequence. When that space is filled the additional gas flowed into the gas compartment means will fill a space closer and closer to the lifting end as the filled gas amount increases.

According to one specific embodiment of the present invention, the gas inflow means is located at the holding means. This is a natural place to provide the gas inflow means at in view of the explanation above, and when the holding means is provided close to the gas accumulating end, this also totally ensures that this end will be the first end filled with gas so that there is no risk for any possible, however unlikely, lift disturbances at the lifting end when flowing gas into the compartment means.

According to another embodiment of the present invention, the measuring device comprises a base plate whereupon the holding means and the sensor means are located. This base plate may be of interest to ensure a rigid and flat bottom for the device so that the device will stand securely on the bottom of a liquid bath.

As mentioned, the sensor means of the cell may be of different type, such as magnetic or optical, and be provided at different places. However, according to one specific embodiment of the present invention, the sensor means comprises a magnetic sensor provided to be in physical contact with the lifting end of the gas compartment means when the gas compartment means has its initial standby position and wherein there is provided a magnet on the lifting end of the gas compartment means. When the compartment is filled and takes up an additional amount gas, the compartment means pivots upwards. The magnet at the lifting end then is released from the magnetic sensor, and the sensor generates a signal and/or changes the state of a signal which is possible to detect on a computer. The signal or change in signal is generated until the gas is released from the compartment means and the compartment means has returned to its initial standby position. The time needed for the gas compartment to release all of the gas and then return to its initial standby position is very small, such as about e.g. 1-2 seconds if the wet space is a liquid water bath. This time of course depends on inter alia the viscosity of the liquid bath. This is an effect due to the design of the cell according to the present invention, which design ensures the pivoting movement to be fast and hence the releasing of the gas from the compartment means to be made very quickly where the gas is released completely.

According to one specific embodiment of the present invention, the sensor means comprises an electronic circuit with a magnetic switch, and wherein the sensor means is arranged so that a digital signal is generated and/or the state of a digital signal is changed, during the time from that the gas compartment means pivots upwards from the sensor means and until the gas compartment means returns to its initial standby position in contact with the sensor means. As mentioned before, one example according to the present invention is a false or true signal generated at the initial standby position and during the pivoting cycle, respectively.

As mentioned before, the design of the compartment means may vary. It is possible that the design has a quadratic or rectangular cross section, seen from the side. Such a design would render an equal gas storing capability along the entire compartment means. In this case it is important to place the holding means with its pivoting element in a position away from the middle of the compartment means to ensure that one end will be the lifting end and one end will be the gas accumulating end. As may be understood, it is all a matter of mechanical lifting force. According to one embodiment of the present invention, however, the gas storing capacity of the inside of the gas compartment means is larger at the gas accumulating end than at the lifting end. Such a design for the gas compartment means imply a geometrical cross section which is not quadratic or rectangular. According to another specific embodiment of the present invention, the gas accumulating end has a higher vertical position than the lifting end at the initial standby position. According to yet another specific embodiment of the present invention, the gas compartment means has a semi-tubular or triangular cross section perpendicular to a longitudinal direction of the gas compartment means. According to another specific embodiment, the gas compartment means defines a geometrical bottom surface of the gas compartment means which is substantially rectangular or quadratic. According to this specific embodiment, the actual physical bottom of the gas compartment means is parallel in relation to the bottom of the vessel containing the liquid bath and hence base plate, if provided, when the cell is in its initial standby position. Moreover, the actual physical bottom of the gas compartment means may also be integrated with the bottom of the vessel so that they in fact share the same bottom.

A gas compartment means having, at the initial standby position, a rectangular geometrical bottom surface and a cross section that is triangular perpendicular to a longitudinal direction of the gas compartment means is shown in FIG. 1A-D, where the gas accumulating end also has a higher vertical position than the lifting end at the initial standby position.

As mentioned above, the gas compartment means of the cell according to the present invention has one geometrical physical volume, which is given by the geometrical design and thus is constant, and one active volume which is the volume of gas needed to render the gas compartment means to pivot upwards. According to one specific embodiment of the invention, there is provided a means for adjusting the active volume of the gas compartment means. According to one specific embodiment of the present invention, this means for adjusting the active volume is located on top of the gas compartment means, such as shown in FIG. 1A-D. This means for adjusting could be a device having the capability of putting on different weights or floating aids. One example of such a means is shown in FIG. 1A-D, where it is possible to actually screw on different layers (plates or the like), which could increase or decrease the active volume needed to pivot the compartment means upwards. These layers or plates could add only weight, such as when having a density which is higher than the liquid bath, or could be of low-weight material having a density which is lower than the liquid bath and therefore adding floating property and hence decreasing the active volume of the gas compartment means.

One cell according to the present invention may be organized in a system or array of cells. These cells work totally alone, but when having many gas inflows from different containers it is of course of interest to provide a cell array of many cells according to the invention. Therefore, according to one specific embodiment a measuring device system is provided, comprising at least more than one measuring device according to the present invention. In the following, such a measuring device system is also referred to as a flow cells array.

The material of the different parts of the cell according to the present invention may vary. The gas compartment means may e.g. be made of a plastic, plastic glass or a metallic material, such as aluminium. The same is also valid for the base material of the holding means and sensor means. Combinations of the different materials are of course also possible.

As mentioned above, the wet space containing the measuring device according to the present invention is a liquid bath. This liquid bath normally is some kind of aqueous solution. Different components besides water may, however, be provided in the liquid bath. Therefore, according to one specific embodiment of the present invention, the wet space is a liquid bath containing at least one of the components chosen from the group consisting of water, an acid, a cleaning agent, an aqueous based solution and an organic solvent. According to the present invention, the choice of the liquid bath should be made so that the target gas component, such as methane, has a low dissolvability and is chemical inert to the liquid bath.

Biological Methane Potential (BMP) Test

Utilization of biogas as an energy carrier has been recognized as one realistic way to negate the necessity for fossil-fuel based energy, exerting less impact on the environment and natural resources. To secure a sufficient biomass resource for energy recovery, biogas production from different field crops are evaluated for screening the one with the highest net energy yields per hectare in the region. With this, and the widespread application of anaerobic digestion (AD) for biogas production, there is an increasing need for rapid and highly automated methods for evaluating various feedstock and optimizing the anaerobic fermentation process. Biological methane potential (BMP) tests are used to establish anaerobic biodegradability for determination of the ultimate methane potential of wastes or biomass, but are also used for determination of the rate of this biodegradation in general. However, normal procedures not only require expensive laboratory equipment (e.g. gas chromatography), but are also very time- and labour-consuming. Further, the produced biogas and methane content can only be measured occasionally in manual mode, making it impossible to obtain satisfactory data for the degradation dynamic. Furthermore, it is also difficult to perform the tests satisfactorily within the normal working routine of a laboratory. Certainly, there is a need for highly automated methane potential tests in such a way that much better data quality can be obtained, less labour-intensive and no expensive laboratory equipment, such as a gas chromatograph, shall be needed for performing the tests.

The measuring device according to the present invention finds use in many different technical areas. It can be used to build flow cell arrays (multi-flow cell arrangement, see FIG. 2) and used for BMP tests. Moreover, the measuring device can be used as a standalone device to provide on-line, real-time monitoring of biogas production from small-scale biogas digesters. However, it is important to understand that the measuring device also finds use for monitoring other type of gas which is inert or has low solubility to the liquid.

As may be understood from the description above, the present invention may also be directed to actual small scale production of biogas and simulation of a biogas process in laboratory scale. According to one specific embodiment of the present invention, there is provided a lab scale process system for simulation of biogas production, the lab scale process system comprising:

at least one digester with good agitation;
optionally at least one additional measuring device or sensor for measuring gas composition on-line or in spot check in regular basis; and
a measuring device or measuring device system according to the present invention being immersed in a wet space.

According to the present invention there is also provided the use of a measuring device, according to the present invention, for the measurement of a gas flow. According to one embodiment, the gas flow is a biogas flow, biomethane gas is separated from the biogas flow and the biomethane gas flow is then measured.

As disclosed above, there exist measuring devices for measuring bio-methane on the market today. One of the approaches combines MilliGascounter® from Ritter (DE4006508) with near-infra-red methane sensors from BlueSens for on-line detection of methane production. The second one is an apparatus of optical bubble counter from Challenge Technology (U.S. Pat. No. 5,092,181) for raw biogas flow measurement. The costs for these devices are very high in comparison to the present invention, when comparing the different single components of the systems. Since a number of batch tests often are needed to be carried out at the same time, these two known approaches will end up with a rather high instrument cost. Although both approaches aim for less labor-intensive test and better data quality, the cost of equipments is still too high to be widely equipped in both industry and academic research institutes. The proposed AMPT technology according to the present invention will solve the problem by a novel design of a wet gas flow meter array that can measure multi-channels of ultra low flow of methane gas simultaneously with high precision and very low cost.

Detailed Description of the Figures

Below, the drawings are described in more detail.

FIG. 1A-D is an illustration of one example of a measuring device according to the present invention and the working principle of the same. In FIG. 1A all of the reference numberings are given. The measuring device 1 comprises a cell 2 having a gas inflow means 3 and a compartment means 4, said compartment means having a gas accumulating end 5 and a lifting end 6. The holding means 7 of the cell 2 holds the compartment means 4 in place and said holding means 7 has a pivoting element 8. The pivoting element 8 enables the compartment means 7 to pivot upwards from its initial standby position showed in FIG. 1A, thereby to release the gas hold inside of the compartment means 4, and back again to its initial standby position. This movement and release of gas contained inside of the gas compartment means 4 is triggered by the receipt of an additional gas amount, as small as just another gas bubble, into the inside of the gas compartment means 4 when already being full of gas.

The cell 2 also comprises a sensor means 9 being provided to generate a signal or change the state of a signal when the compartment means 4 is not in its initial standby position, that is during the upwards pivoting, releasing of the gas and movement back to the initial standby position, which in this case is against the sensor means 9. In this case, the sensor means 9 comprises a magnetic sensor 11 and a magnet 12 is provided at the lifting end 6 of the gas compartment means 6 to ensure that the magnetic sensor will be able to generate a signal when the gas compartment 4 means is not in its initial standby position.

In this case a base plate 10 is provided to uphold the sensor means 9 and the holding means 7 in the same plane, i.e. on the bottom of a wet space, such as a liquid bath. Moreover, in this case the compartment means 4 has a triangular cross section, perpendicular to a longitudinal direction 13 of the gas compartment means 4, and defines a geometrical bottom surface 14 of the gas compartment means 4 which is substantially rectangular. Furthermore, the gas accumulating end 5 has a higher vertical position than the lifting end 6 at the initial standby position. Moreover, in this specific example, a means 15 for adjusting the active volume of the gas compartment means 4 is located on top of the gas compartment means 4.

FIG. 1B. actually shows the same thing as FIG. 1A, however in this case the figure is intended to show a compartment means 4 which may be totally full with gas and which only need one more gas bubble to pivot upwards. Such a small amount of gas has been received inside of the gas compartment means 4 according to FIG. 1C, hence the compartment means 4 has quickly began to pivot upwards and started releasing the contained gas. This process is very fast and gas releasing is always completely due to the special design described previously, and the compartment means 4 then pivots back to its initial standby position, as is showed in FIG. 1D. As is mentioned, during the time when the magnet 12 of the compartment means 4 is not in contact with the magnetic sensor 11 of the sensor means 9, the sensor means 9 generates a signal or changes the state of a digital line which is detected by a computer. As mentioned before, this signal generation or state of a digital line shifting may be accomplished by other means and with other sensor types.

Figure 2:
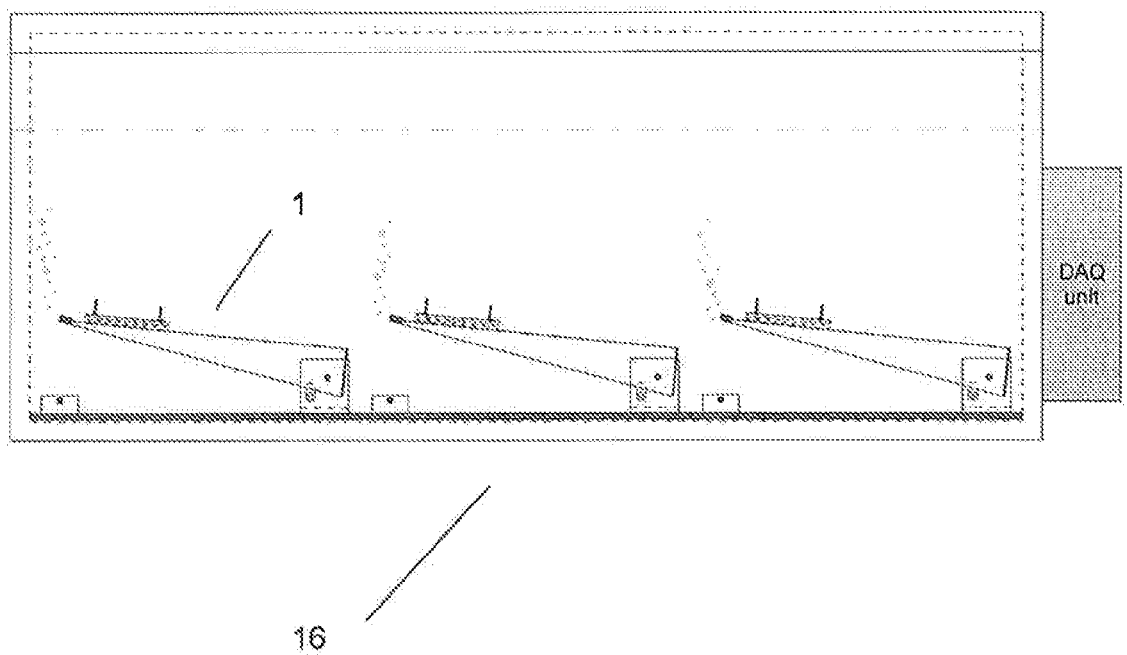
FIG. 2 is an illustration of one example of a measuring device system or flow cells array according to the present invention.

FIG. 2 is an illustration of one example of a measuring device system 16 or flow cells array according to the present invention. The measuring device system 16 in this case comprises three measuring devices 1 according to the present invention. The cells 2 of the measuring devices 1 are the same as in FIG. 1A-D, which of course only should be seen as one possible example. The computer DAQ unit is also showed in FIG. 2.

Conclusions

The measuring device or measuring device system according to the present invention finds use for measuring a biogas flow, a biomethane gas flow and other small gas flows. The key properties of the measuring device according to the present invention may be summarised according to the following:
- works according to a new principle ensuring high measuring accuracy;
- is simple in its design and construction;
- has a low material and construction cost;
- has a standardized and modularized cell design, however still has the possibility for varying the compartment volume;
- has calibration capabilities;
- is potentially capable to measure ultra small gas flow, as low as few milliliters per day; and
- is feasible for multi-flow cell arrangement, such as flow cell array for a large number of gas flow monitoring.

The invention claimed is:

1. A measuring device for measuring an ultra low gas flow, the measuring device comprising:
   at least one cell comprising a gas inflow device;
      a gas compartment device including
         a predefined inner geometric physical volume and active volume, the gas compartment device consisting essentially of:
            one gas accumulating end,
            one lifting end, and
            a geometric gas collecting point inside of the gas compartment device during a gas filling cycle, the geometric gas collecting point moving, with each additional quantum of gas, further and further from the gas accumulating end to the lifting end during the gas filling cycle, and wherein the cell comprises a holding device including a pivoting element enabling the gas compartment device to pivot upwards when the geometric gas collecting point is positioned at the lifting end and wherein the lifting force is larger than the down-pressing force at the lifting end, thereby releasing all of the accumulated gas in the gas compartment device, and then pivoting back to its initial standby position for new receipt and storage of gas during another gas filling cycle until next releasing sequence, and wherein the at least one cell also comprises a sensor provided to generate a signal and/or change the state of a signal when the gas compartment device is not in its initial standby position, wherein the gas storing capacity of the inside of the gas compartment device is larger at the gas accumulating end than at the lifting end, wherein the gas accumulating end has a higher vertical position than the lifting end at the initial standby position, and further wherein the holding device is located at or near the gas accumulating end.

2. The measuring device according to claim 1, wherein the sensor device is provided to be in physical contact with the lifting end of the gas compartment device when the gas compartment device has its initial standby position.

3. The measuring device according to claim 1, wherein the gas inflow device is located at the holding device.

4. The measuring device according to claim 1, wherein the measuring device comprises a base plate whereupon the holding device and the sensor are located.

5. The measuring device according to claim 1, wherein the sensor comprises a magnetic sensor provided to be in physical contact with the lifting end of the gas compartment device when the gas compartment device has its initial standby position and wherein there is provided a magnet on the lifting end of the gas compartment device.

6. The measuring device according to claim 1, wherein the gas compartment device has a semi-tubular or triangular cross section perpendicular to a longitudinal direction of the gas compartment device.

7. The measuring device according to claim 1, wherein the gas compartment device defines a geometrical bottom surface of the gas compartment device which is substantially rectangular or quadratic.

8. The measuring device according to claim 1, wherein the sensor comprises an electronic circuit with a magnetic switch, and wherein the sensor is arranged so that a digital signal is generated and/or a state of a digital signal is changed, during the time from that the gas compartment device pivots upwards from the sensor and until the gas compartment device returns to its initial standby position in contact with the sensor.

9. The measuring device according to claim 1, wherein there is provided a means for adjusting the active volume of the gas compartment device.

10. The measuring device system comprising at least more than one measuring device according to claim 1.

11. A lab scale process system for simulation of biogas production, the lab scale process system comprising:
   at least one digester with an agitation device; and
   a measuring device according to claim 1 being immersed in a wet space.

12. The lab scale process system of claim 11, further comprising:
- at least one additional measuring device or sensor to measure gas composition on-line or in spot check in regular basis.

13. The lab scale process system for simulation of biogas production, the lab scale process system comprising:
- at least one digester with an agitation device; and
- a measuring device system according to claim 10 being immersed in a wet space.

14. The lab scale process system of claim 13, further comprising:
- at least one additional measuring device or sensor to measure gas composition on-line or in spot check in regular basis.

15. A measuring device for measuring an ultra low gas flow, the measuring device comprising:
- at least one cell comprising:
  - a gas inflow device;
  - a gas compartment device consisting essentially of:
    - a predefined inner geometric physical volume,
    - an active volume,
    - a gas accumulating end,
    - a lifting end, and
    - a geometric gas collecting point inside of the gas compartment device during a gas filling cycle,
  - wherein the geometric gas collecting point moving, with each additional quantum of gas, further and further from the gas accumulating end to the lifting end during the gas filling cycle, and
  - a holding device including
    - a pivoting element enabling the gas compartment device to pivot upwards when the geometric gas collecting point is positioned at the lifting end and
    - wherein when a lifting force is larger than a down-pressing force at the lifting end, then the lifting end pivots upwards and subsequently releases accumulated gas in the gas compartment device, and subsequent to release of the accumulated gas then the lifting end pivots downwards to its initial standby position for subsequent receipt and storage of gas during another gas filling cycle until the lifting force again becomes larger than the down-pressing force at the lifting end in which accumulated gas in the gas compartment device is released, and
  - wherein the at least one cell also comprises a sensor provided to generate a signal and/or change the state of a signal when the gas compartment device is not in its initial standby position, wherein the gas storing capacity of the inside of the gas compartment device is larger at the gas accumulating end than at the lifting end,
  - wherein the gas accumulating end has a higher vertical position than the lifting end at the initial standby position, and further wherein the holding device is located at or near the gas accumulating end.

16. The measuring device according to claim 15, further comprising an adjusting unit attached and located on top of the gas compartment device at the lifting end of the gas compartment device.

17. A gas flow measuring device comprising:
- at least one cell comprising:
  - a base plate;
  - a sensor attached to the base plate;
  - a holding device attached to the base plate;
  - a pivot element attached to the holding device;
  - a gas inflow device attached to holding device; and
  - a gas compartment device pivotally attached to the pivot element consisting essentially of:
    - a predefined inner geometric physical volume,
    - an active volume,
    - a gas accumulating end,
    - a lifting end,
    - a magnet attached to the lifting end, and
    - a geometric gas collecting point inside of the gas compartment device during a gas filling cycle.

18. The gas flow measuring device of claim 17, further comprising a plurality of the cells.

19. The gas flow measuring device of claim 17,
- wherein the geometric gas collecting point growing, with each additional quantum of gas, further and further from the gas accumulating end to the lifting end during the gas filling cycle, and
- wherein the pivot element enabling the lifting end of the gas compartment device to pivot upwards when the geometric gas collecting point is positioned at the lifting end and
- wherein when a lifting force is larger than a down-pressing force at the lifting end, then the pivot element enabling the lifting end pivots upwards and subsequently releases accumulated gas in the gas compartment device, and subsequent to release of the accumulated gas then the lifting end pivots downwards to its initial standby position for subsequent receipt and storage of gas during another gas filling cycle until the lifting force again becomes larger than the down-pressing force at the lifting end in which accumulated gas in the gas compartment device is released, and
- wherein the sensor provided to generate a signal and/or change the state of a signal when the gas compartment device is not in its initial standby position, wherein the gas storing capacity of the inside of the gas compartment device is larger at the gas accumulating end than at the lifting end,
- wherein the gas accumulating end has a higher vertical position than the lifting end at the initial standby position, and further wherein the holding device is located at or near the gas accumulating end.

\* \* \* \* \*